(12) United States Patent
Horng

(10) Patent No.: US 7,153,121 B2
(45) Date of Patent: Dec. 26, 2006

(54) ONE-PIECE ICE CREAM SCOOP

(76) Inventor: Ruey-Lan Horng, No. 420, Lane 942, Da-Wan Road, Yung-Kang City, Tainan Hsien (TW)

( * ) Notice: Subject to any disclaimer, the term of this patent is extended or adjusted under 35 U.S.C. 154(b) by 0 days.

(21) Appl. No.: 10/885,085

(22) Filed: Jul. 7, 2004

(65) Prior Publication Data
US 2006/0008551 A1 Jan. 12, 2006

(51) Int. Cl.
A23G 9/28 (2006.01)
(52) U.S. Cl. .................................... 425/286; 425/444
(58) Field of Classification Search ............... 425/221, 425/276–286, 444; D7/681; 30/324
See application file for complete search history.

(56) References Cited

U.S. PATENT DOCUMENTS 4,392,806 A * 7/1983 Houle ..................... 425/286

2004/0089982 A1 * 5/2004 Witthoft .................. 264/334
2004/0134079 A1 * 7/2004 Lion et al. ................ 30/324

FOREIGN PATENT DOCUMENTS

DE 36 22 034 * 1/1988

OTHER PUBLICATIONS

English abstracts for DE 36 22 034.*

* cited by examiner

Primary Examiner—Donald Heceknberg
(74) Attorney, Agent, or Firm—Rosenberg, Klein & Lee

(57) ABSTRACT

An ice cream scoop includes a handle, a bowl formed on an end of the handle, the bowl including a cutout, and a resilient rejecting member extending from the handle into the cutout and spaced from a perimeter delimiting the cutout. The handle may include two substantially parallel slits communicated with the cutout, leaving a resilient section forming a part of the resilient rejecting member. The resilient section may include a pressing portion on a rear side thereof. When rejecting of ice cream is required, the user may press the pressing portion to reject the ice cream in the bowl.

3 Claims, 6 Drawing Sheets

ONE-PIECE ICE CREAM SCOOP

BACKGROUND OF THE INVENTION

1. Field of the Invention

The present invention relates to an ice cream scoop. More particularly, the present invention relates to an ice cream scoop with a rejecting member for rejecting ice cream.

2. Description of the Related Art

FIG. 1 of the drawings shows a typical conventional ice cream scoop 1 having a rejecting member for rejecting ice cream. The ice cream scoop 1 includes a handle 12, a bowl 11 formed on an end of the handle 12, and a rejecting member 13. The bowl 11 has a cutout or groove 10 for receiving a portion of the rejecting member 13. The handle 12 includes a groove 17 for accommodating the other portion of the rejecting member 13. An intermediate section of the rejecting member 13 is pivotally connected to the handle 12 by a pin 16 extending through holes 18 of the handle 12 and through a hole 19 of the rejecting member 13. An end 14 of the rejecting member 13 can be pressed for rejecting ice cream in the bowl 11, and a spring 15 is mounted in the groove 17 of the handle 12 for biasing the end 14 of the rejecting member 13 back to its original position when the pressing force is released. Taiwan Utility Model Publication Nos. 80712 and 94636 and U.S. Pat. Nos. 4,161,381; 4,392,806; and 4,699,582 disclose similar ice cream scoop structures. However, ice cream scoops of this type have many elements, resulting in a high manufacturing cost. Further, dirt is apt to hide in the grooves 10 and 17 and the holes 18 and 19 and thus contaminate the ice cream. Further, malfunction occurs easily and repair is often required.

SUMMARY OF THE INVENTION

An object of the present invention is to provide an ice cream scoop with a simple structure while reliably rejecting ice cream.

An ice cream scoop in accordance with the present invention includes a handle, a bowl formed on an end of the handle, the bowl including a cutout, and a resilient rejecting member extending from the handle into the cutout and spaced from a perimeter delimiting the cutout.

In an embodiment of the invention, the handle includes two substantially parallel slits communicated with the cutout, leaving a resilient section forming a part of the resilient rejecting member. The resilient section includes a pressing portion on a rear side thereof. When rejecting of ice cream is required, the user may press the pressing portion to reject the ice cream in the bowl.

The one-piece ice cream scoop with a resilient rejecting member in accordance with the present invention has a simple structure and thus has a low manufacturing cost. Further, malfunction of the one-piece ice cream scoop and contamination of ice cream are less likely to occur, as the one-piece ice cream scoop is easy to clean.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
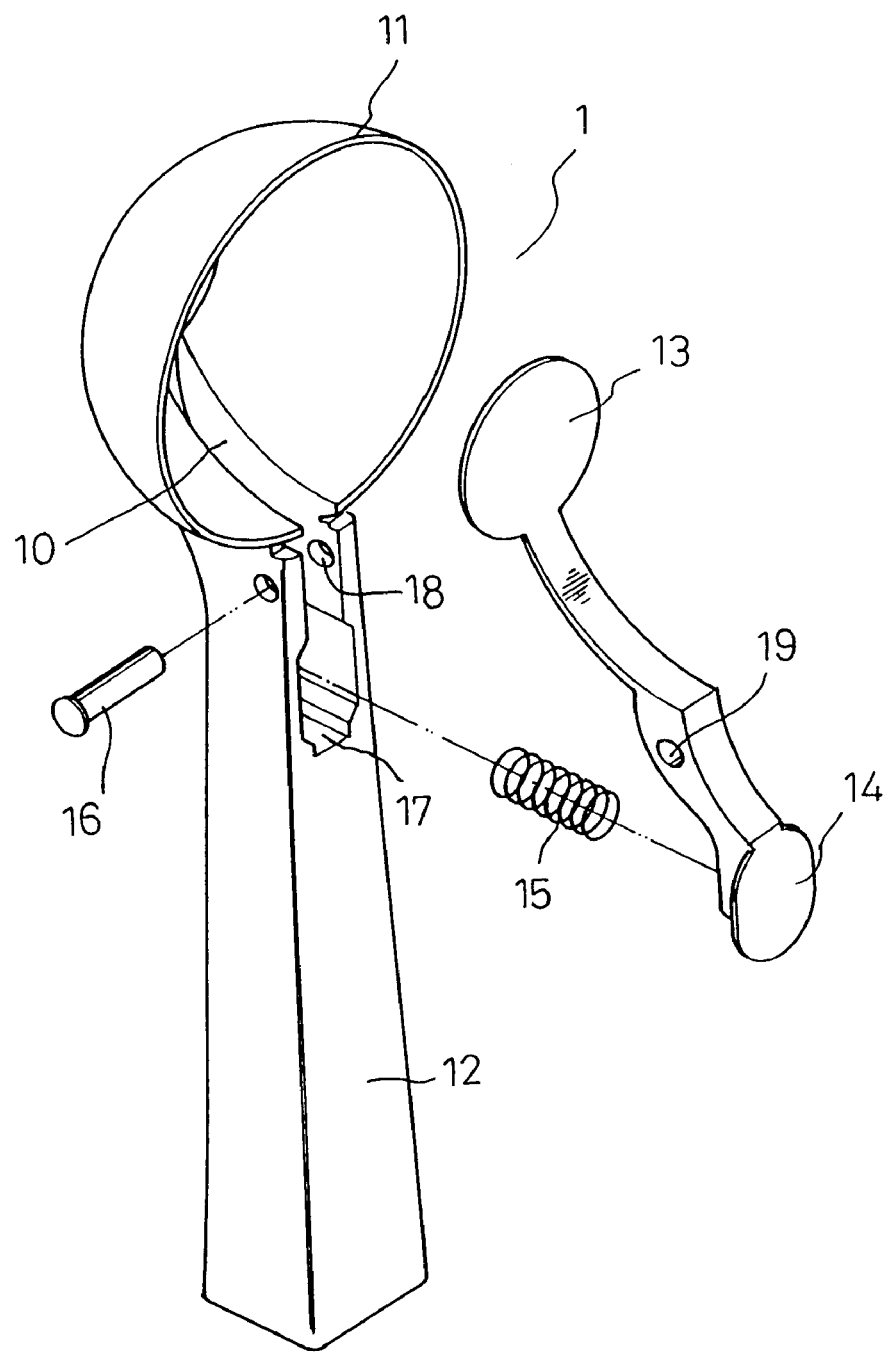
FIG. 1 is an exploded perspective view of a conventional ice cream scoop.
Figure 2:
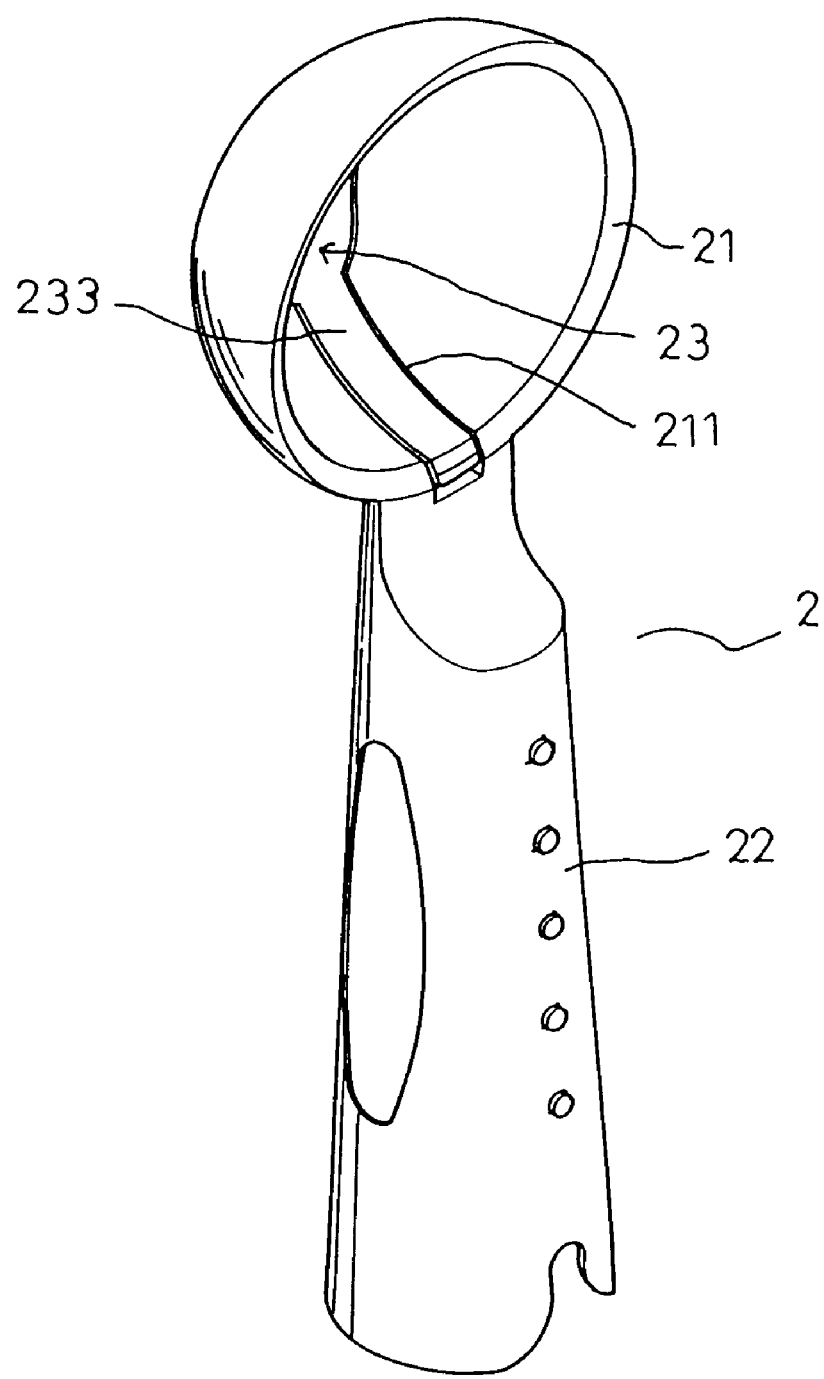
FIG. 2 is a front perspective view of a one-piece ice cream scoop in accordance with the present invention.
Figure 3:
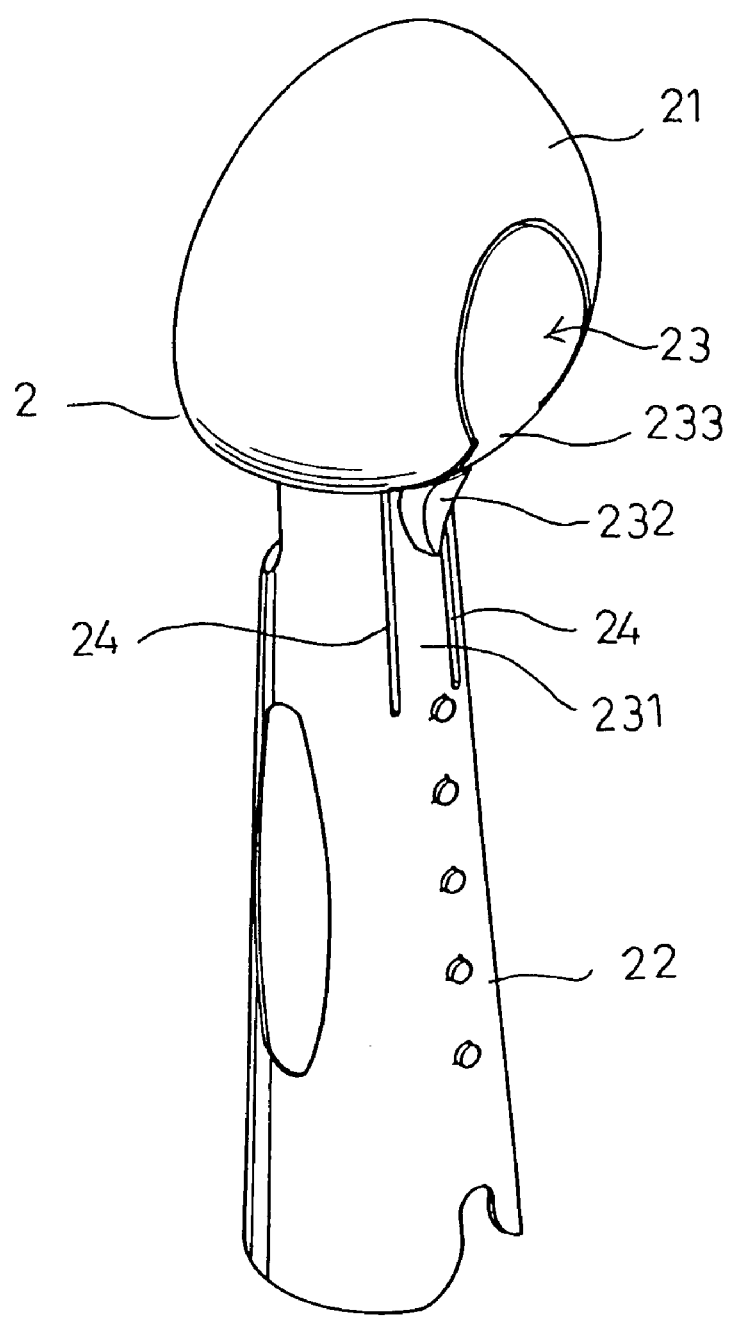
FIG. 3 is a rear perspective view of the one-piece ice cream scoop in accordance with the present invention.
Figure 4:
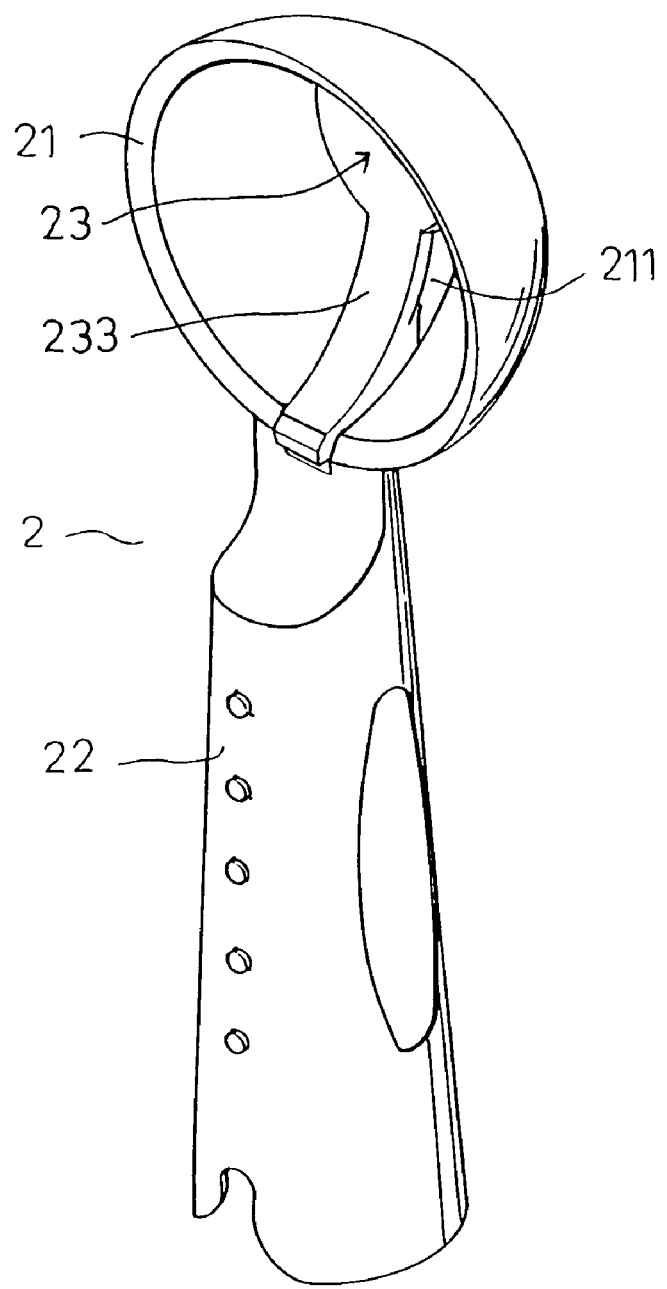
FIG. 4 is another front perspective view of the one-piece ice cream scoop in accordance with the present invention.

Referring to FIGS. 2 through 4, a one-piece ice cream scoop 2 in accordance with the present invention comprises a handle 22 and a bowl 21 integrally formed on an end of the handle 22.

Figure 5:
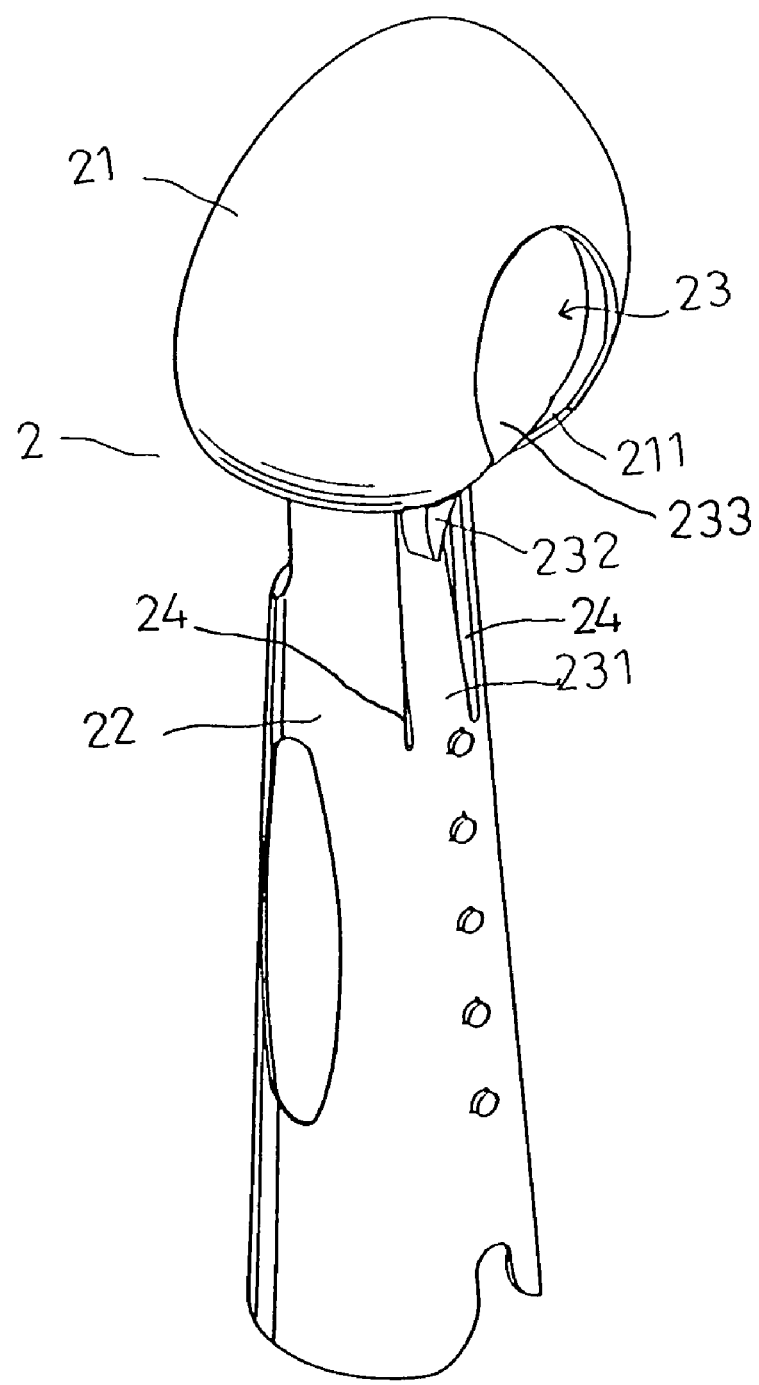
FIG. 5 is a rear perspective view of the one-piece ice cream scoop in a state for rejecting ice cream.
Figure 6:
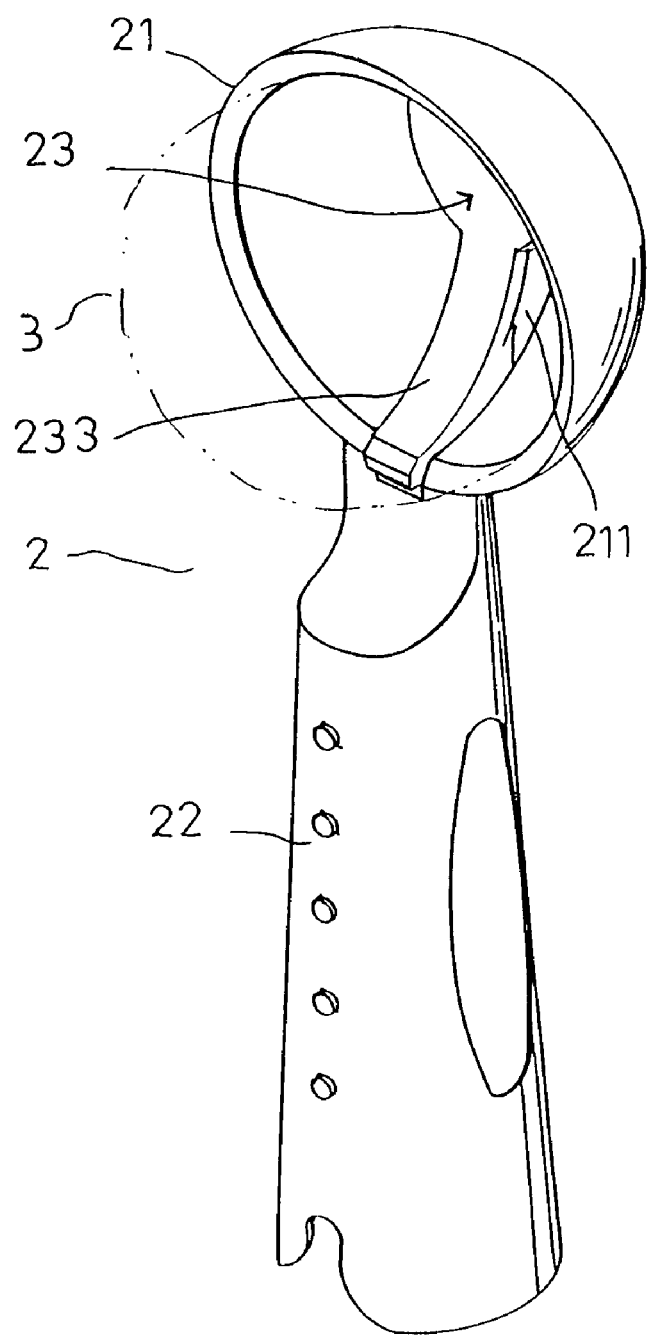
FIG. 6 is a perspective view illustrating use of the one-piece ice cream scoop in accordance with the present invention.

The handle 22 includes two substantially parallel slits 24 extending in a rear side thereof, leaving a resilient rejecting plate 23. As can be seen from FIG. 4, the bowl 21 includes a cutout 211 communicated with the slits 24. As can be seen from FIGS. 2 and 3, the rejecting member 23 extends into the cutout 211 and spaced from a perimeter delimiting the cutout 211. Thus, the resilient rejecting member 23 includes a resilient end or section 231 extending from the handle 22. The resilient rejecting member 23 further has a section 233 in the cutout 211 of the bowl 21. As illustrated in FIG. 3, the resilient member 23 has a pressing portion 232 (in the form of a protrusion) on a rear side thereof. When rejecting ice cream is required, the user may press the pressing portion 232 to reject ice cream in the bowl 21, as shown in FIG. 5. The resilient rejecting member 23 returns to its original position shown in FIG. 3 after the pressing force is released. FIG. 6 shows use of the ice cream scoop in accordance with the present invention.

The one-piece ice cream scoop with a resilient rejecting member in accordance with the present invention has a simple structure and thus has a low manufacturing cost. Further, malfunction of the one-piece ice cream scoop and contamination of ice cream are less likely to occur, as the one-piece ice cream scoop is easy to clean.

The slits 24 in the handle 22 may be omitted, and the resilient handle 23 is accommodated in the cutout 211 of the bowl 21 and has an end or section integrally formed with (or extending from) the handle 22.

Although a specific embodiment has been illustrated and described, numerous modifications and variations are still possible without departing from the essence of the invention. The scope of the invention is limited by the accompanying claims.

What is claimed is:

1. A one-piece ice cream scoop comprising:
   a handle having an end;
   a bowl having an inner concave surface and an outer convex surface, said bowl having formed on the end of the handle, the bowl including a cutout; and
   a resilient rejecting member extending from the handle into the cutout and spaced from a perimeter delimiting the cutout, said resilient rejecting member including a pressing element being located adjacent said outer convex surface of the bowl and opposite said inner concave surface, said pressing element secured to said resilient rejecting member and extending external for displacement of said resilient rejecting member for rejecting ice cream from said bowl.

2. The one-piece ice cream scoop as claimed in claim 1, with the handle including two substantially parallel slits communicated with the cutout, leaving a resilient section forming a part of the resilient rejecting member.

3. The one-piece ice cream scoop as claimed in claim 1, wherein said pressing element being formed on a rear side of said resilient section.

* * * * *